(12) United States Patent
Newman et al.

(10) Patent No.: US 7,266,699 B2
(45) Date of Patent: Sep. 4, 2007

(54) CRYPTOGRAPHIC INFRASTRUCTURE FOR ENCRYPTING A DATABASE

(75) Inventors: Aaron Charles Newman, New York, NY (US); Jay Mari, Smithtown, NY (US)

(73) Assignee: Application Security, Inc., New York, NY (US)

( * ) Notice: Subject to any disclaimer, the term of this patent is extended or adjusted under 35 U.S.C. 154(b) by 806 days.

(21) Appl. No.: 10/230,462

(22) Filed: Aug. 29, 2002

(65) Prior Publication Data

US 2003/0046572 A1    Mar. 6, 2003

Related U.S. Application Data

(60) Provisional application No. 60/315,900, filed on Aug. 30, 2001.

(51) Int. Cl.
*H04L 9/00* (2006.01)
(52) U.S. Cl. .................................................. 713/182
(58) Field of Classification Search ................ 713/193, 713/182; 380/45, 277; 705/51
See application file for complete search history.

(56) References Cited

U.S. PATENT DOCUMENTS

| | | | | |
|---|---|---|---|---|
| 5,369,702 A | | 11/1994 | Shanton | ........................ 713/166 |
| 5,577,125 A | * | 11/1996 | Salahshour et al. | ............ 380/54 |
| 5,606,610 A | | 2/1997 | Johansson | ..................... 713/193 |
| 6,292,895 B1 | | 9/2001 | Baltzley | ....................... 713/168 |
| 6,292,899 B1 | | 9/2001 | McBride | ....................... 713/200 |
| 6,336,121 B1 | * | 1/2002 | Lyson et al. | .................. 707/201 |
| 6,950,523 B1 | * | 9/2005 | Brickell et al. | .............. 380/286 |
| 7,093,137 B1 | * | 8/2006 | Sato et al. | .................... 713/193 |
| 2003/0123671 A1 | * | 7/2003 | He et al. | ...................... 380/282 |
| 2004/0255133 A1 | * | 12/2004 | Lei et al. | ...................... 713/193 |

\* cited by examiner

*Primary Examiner*—Gilberto Barron
*Assistant Examiner*—Thomas Ho
(74) *Attorney, Agent, or Firm*—Peter S. Canelias

(57) ABSTRACT

The invention provides a transparent encryption infrastructure which allows the user to point-and-click on columns and tables to encrypt data. The creation of triggers and views are also easily implemented, to encrypt and decrypt data, to manage the encryption keys and to grant and revoke access to a column. Public and private key pairs are hashed and encrypted with a valid password. The process or encryption starts by creating a randomly generated symmetrical key, encrypting the symmetrical key with the private key for each user authorized to decrypt the data, and storing the encrypted symmetrical key, along with the user's name and the column name, in the database.

5 Claims, 3 Drawing Sheets

CRYPTOGRAPHIC INFRASTRUCTURE FOR ENCRYPTING A DATABASE

CLAIM FOR PRIORITY

This application claims the benefit of U.S. Provisional Application No. 60/315,900, filed Aug. 30, 2001.

BACKGROUND OF THE INVENTION

Encryption of non-relational files is a well-known art in the field of cryptography. These cryptosystems allow a user to digitally encrypt information stored in a non-relational format such as flat files residing on an operating system. This is accomplished by encrypting and decrypting the entire non-relational file with a single encryption key and storing that single encryption key offline in a secure format.

Traditional encryption is designed to efficiently encrypt large streams of contiguous data. The same concepts do not apply as well to relational data. Encryption of relational data requires fast encryption and decryption of data based on random access to various records of the file. Emphasis for relational data must be placed on decreasing the number of decryptions occurring on small pieces of data. To understand this, realize that databases are designed to provide very quick searching of records. This means that encryption of data in databases must be performed in a way that facilitates fast searching on the records. This feature of fast searching is one of the strength of databases, and applying traditional methods of encrypting non-relational files result in poor performance. Another complication with encrypting data is storing the encryption keys securely. With encryption of non-relational files, entire files are encrypted and the need for managing large numbers of keys for the same files is minimal. Within non-relational data, the emphasis on ownership of a file is on a single individual. This allows traditional encryption systems to ignore the problem of allowing multiple users access to the same encrypted file. With databases, ownership of data within a column is not clearly defined. Databases are designed to allow multiple users to access the same data. Thus there is need of a way of securing the encryption keys for a column where multiple users can encrypt and decrypt the data.

This invention relates in general to encryption of data in relational database management systems. In particular, this invention relates to a system and method for securely encrypting data in a column and managing the keys used to encrypt the data, and relates to cryptographic infrastructure that provides database column and row-level encryption within the tables of a database. The invention provides transparent encryption functionality that allows the user, usually a database administrator or developer, to encrypt data within a database without implementing details. As a low level interface, the invention allows a PL/SQL programmer to use encryption as he or she sees fit. This allows Oracle developers to write proprietary encryption systems for use in Oracle. This low level interface is similar in concept to the DBMS_OBFUSCATION_TOOLKIT. The present invention, however, provides the following improvements:

The invention provides over 25 algorithms including public key and symmetrical key algorithms, hashing functions, and stream and block cipher. The prior art, in particular Oracle's DBMS_OBFUSCATION_TOOLKIT, only supports Data Encryption Standard (DES) and MD5.

The invention provides variable length keys to make encryption as strong or as fast as desirable. The prior art is restricted to 56, 112, and 168 bit keys for DES only.

The invention provides a graphical console that allows the user to create working code by pointing and clicking, and provides fine-grained encryption functionality allowing the user to choose the block modes, initialization vectors, and key lengths of the algorithms to use. The prior art only supports CBC mode.

The invention provides for the encryption of NUMBER, VARCHAR, CHAR, RAW, LONG, and LOB data types. The prior art only encrypts RAW and VARCHAR data types.

The invention supports strong generation of random numbers for use as keys. The prior art, in particular Oracle8i DBMS_OBFUSCATION_TOOLKIT, provides no method of generating random numbers.

BRIEF SUMMARY OF THE INVENTION

The present invention provides a system and method for storing data in a relational database management system in a way that substantially eliminates or reduces disadvantages and problems associated with encryption of non-relational data. The system must first be installed on the database. Installation involves placing a computer program on the database that provides the means to encrypt and decrypt the data as well as manage the key to perform these actions. Upon completion of installation, a database user must then execute the encryption software on the database to create a public/private key pair for each user that must access the encrypted data. During the creation of the public/private key pairs, the following items are stored in the table:

a hash of "the user's password concatenated with the user's name"

the private key encrypted with a hash of the user's password the public key

The private key of a user is never stored in the database unencrypted.

The database user must then execute the encryption software to encrypt a column and grant access to a set of users. This process starts by creating a randomly generated symmetrical key, encrypting the symmetrical key with the private key for each user authorized to decrypt the data, and storing the encrypted symmetrical key, along with the user's name and the column name, in the database. Note here that no knowledge of a user's private key is required to create a copy of the symmetrical for the user. Anyone with access to the column may grant the column to any other user without any knowledge of that user's secret.

After the encrypted symmetrical keys are properly stored, the data is then encrypted with a non-encrypted copy of the symmetrical key. Once the column is fully encrypted, all remaining copies of the symmetrical key should be discarded, leaving only encrypt copies of the keys in the database. Now only users with the proper secret, the password needed to decrypt a private key, can decrypt the stored symmetrical keys. The next step is for a user to connect to the database and change the password used to encrypt his or her private key. The user must be given the password original assigned with the private/public key pair was created. Using this password to decrypt the private key, the user then uses the private key to decrypt all symmetrical keys allowing him or her access to a column. With the new password, the user encrypts the symmetrical keys and replaces the current versions of them. Next the user encrypts his or her private key with the new password and stored the new value in the database replacing the old value.

When access to encrypt or decrypt a column is requested, the user must execute the computer program on the database providing the user's passphrase. This passphrase is used to decrypt the private key for the user, and in turn the private key is used to decrypt the symmetrical keys, which are then loaded into the user's secure session memory on the database. Any further access to the column by this specific user can then use the currently loaded decrypted version of the symmetrical keys. Once the symmetrical keys are in memory, the data is decrypted as it is read out of the database using a view and is encrypted is it is written to the table using a trigger.

When an encrypted column is searched for a specific value, the symmetrical key used to encrypt the column is loaded if not already in the user's secure session. The symmetrical key is then used to encrypt the search value. The search is then performed to match the encrypted version of the search value to the encrypt value in the table. This allows searches to be performed on an encrypted column without having to decrypt all the data in the column.

On a periodic basis, the symmetrical key used to encrypt a column should be changed. The computer program on the database creates a new randomly generated symmetrical key and encrypting the symmetrical key with the public key for each user that already has an encrypted copy of the old symmetrical key. The old encrypted symmetrical keys are then replaced by the new encrypted copies of these keys. Finally the data in the column is decrypted with the old symmetrical key and re-encrypted with the new symmetrical key. When a user has completed all tasks, the computer program will remove all copies of the symmetrical and private keys from the user's secure session.

The invention provides a transparent encryption infrastructure which allows the user to point-and-click on columns and tables to encrypt data. The creation of triggers and views are also easily implemented, to encrypt and decrypt data, to manage the encryption keys and to grant and revoke access to a column. Triggers are a feature of Oracle database products. As a low-level interface, the invention provides users with the ability to write proprietary encryption systems to be utilized within a database.

The invention comprises two major components. First, the invention comprises a low-level API, which functions as a shell, providing cryptographic algorithms for Procedural Language/Structured Query Language (PL/SQL) developers. Second, the invention comprises a key management system which utilizes the low-level API to provide a turnkey solution to automatically and transparently encrypt data in columns and rows.

The invention is preferably used with an Oracle database, Unix-based relational database management systems (RDMS) for multi-user enterprise computing, which uses SQL as the standard query language. For those database administrators that wish to build their own encryption systems or utilize a subset of encryption features but find the current Oracle capabilities inadequate, the invention's low-level crypto API can be used effectively. For database administrators that wish to encrypt data without having to implement the details themselves, using the invention's key management system is more appropriate.

The encryption and decryption of data read and written to a column are performed by using triggers and views. Transparency is key to encrypting data stored in a column where the user cannot change how the application will access the data. For example, if an accounting package stores credit card information in the SALES table, a user cannot expect the application to be changed to use a different table or view to decrypt or encrypt data. The present invention can be used to implement encryption on a column transparently, requiring no changes in the application, using views and triggers.

DETAILED DESCRIPTION OF THE INVENTION

Figure 1:
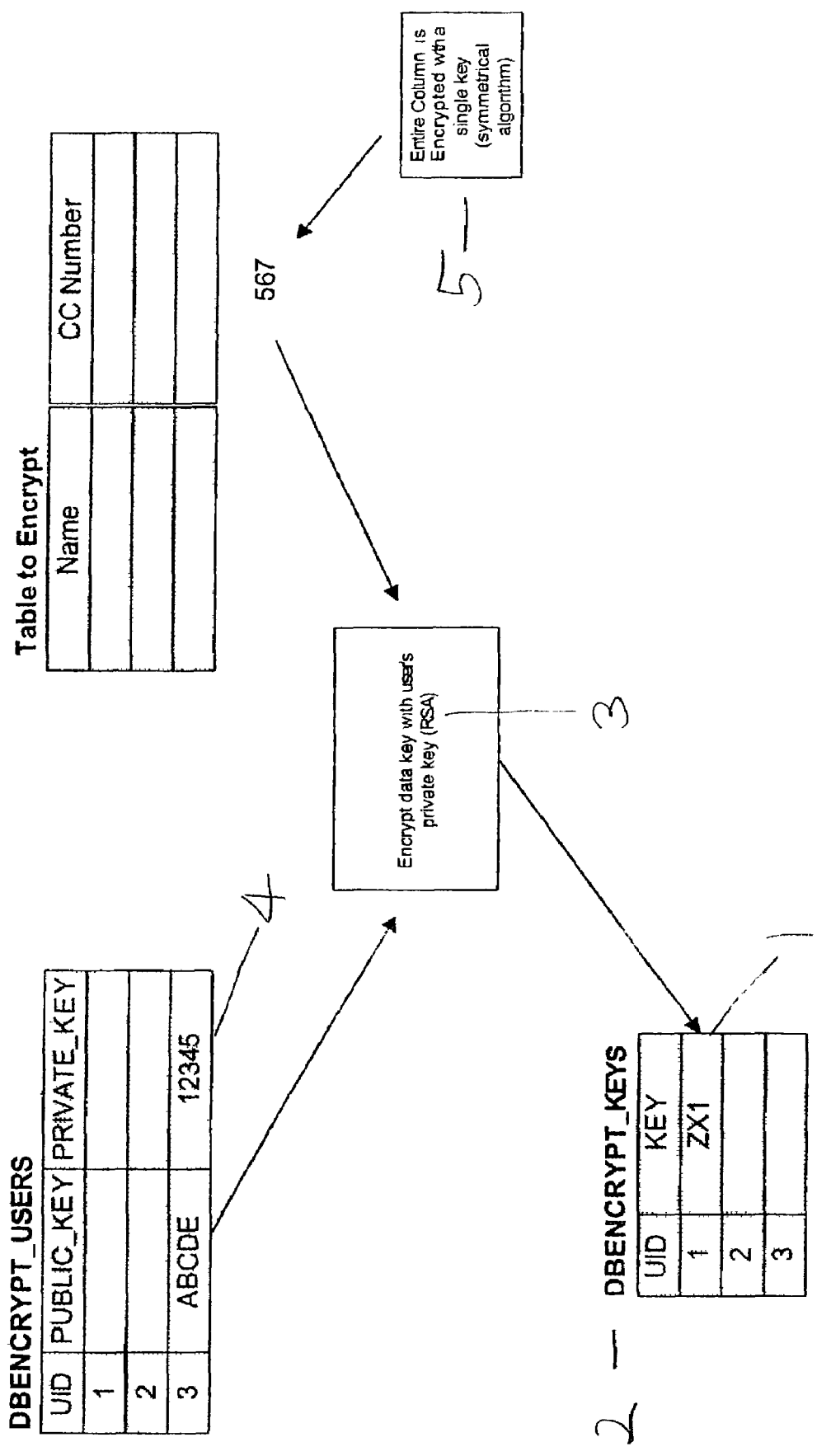
FIG. 1 is a functional block diagram showing column access.

A license file called appsec.lic is used to determine the license status, checked and verified by the server-side module. The invention is based on a server-side module, implemented as a shared library, for example DbEncrypt.dll for Windows or libdbencr.so for UNIX. The server-side module exports a wide variety of encryption functions. The invention provides of over 25 of the strongest and most widely analyzed algorithms, including RSA, DES, AES, RC4, MD5, SHA-1, Blowfish and Twofish.

The invention uses the shared library capabilities of Oracle to reference and call these functions from PL/SQL within the database. This allows encryption to be performed on data as it is read out of and written into the database. When the invention is installed on a database, the following database objects are created, including the DBENCRYT package and package body, a set of DBENCRYPT tables and views, several DBENCRYPT sequences, and the DBENCRYPTLIB library.

The invention is composed of two components—a client front-end and a server module. The first component, the client front-end, may be installed on a system from CD-ROM or downloaded from a website. This component should be installed on the workstation from which the user intents to manage the invention.

After installing the client front-end, the second component, the server module, is installed on each database that the user desires to encrypt. Installation is performed by selecting the option "Install on Remote Server" from the File menu of the program.

To use the invention's API to build a user-specific encryption, the user can employ the client front-end to build sample code. From the client front-end, the user selects the "Encryption API Examples" tab. Within this section, the user can generate sample code to perform the following actions with any available encryption: (1) generate a key; (2) encrypt data; (3) decrypt data; (4) sign data; (5) verify data; (6) hash data.

Transparent encryption is based on a key management system. The key management system uses a hybrid system of symmetrical and asymmetrical algorithms to share symmetrical keys amongst multiple users with different passwords or secrets. The encryption key of a single column, referred to as the "data key" is shared among many users by storing a separate copy of the data key for each user granted access to the column. The copy of the data key is encrypted using the user's public key before it is stored and can only be decrypted with the user's private key. This allows anyone with access to a data key to share it will another user by encrypting the data key with the other user's public key and storing in the DBENCRYPT_KEYS table.

An Oracle user, existing in the table SYS.USER$, is granted access to use the invention's features by adding them as a user. This can be done through the Graphical User Interface (GUI) by opening the "Key Management" tab, then clicking the right mouse button on the "DbEncrypt Users" node and select "Add User" from the popup menu. This can also be done using the ADD_USER function in the DBENCRYPT package. Adding a user creates a row in the DBENCRYPT_USERS table. The details of the data stored in this table depends on the authentication mechanism used.

Encryption is implemented on a column level. When the user selects a column to be encrypted, a symmetrical key is generated for this column. The algorithm and key size is configurable by the user. This action is taken by clicking the right mouse button on the "Encrypted Columns" node and then selecting the "Encrypt Column" item from the menu. For the list of columns shown, select the column to encrypt, the algorithm to use in the encryption, the key size, and the users that are granted access. At this point, the function ADD_ENCRYPTION_TO_COLUMN in the DBENCRYPT package is called. In the function, a random key is generated, a copy of the key is encrypted with each users public key using RSA and the encrypted value is stored in the DBENCRYPT_KEYS table. A single row with a single encrypted key is stored in the DBENCRYPT_KEYS tables for each user that is granted access to the column. The column is then encrypted with the randomly-generated key and the key is discarded.

The actual key used to perform the encryption, the same key that will be later used for decryption, is never stored anywhere in the database. Only copies of the key, encrypted with the user's public key, are stored in the DBENCRYPT_KEYS table. The only way to retrieve the data key is by decrypting a value in the DBENCRYPT_KEYS table with the proper private key.

The decryption process starts when the user retrieves his private key. How this is done depends on the authentication mode selected. This will be described in the next section. The user's private key is stored for the session in a secure "application context". An application context is a feature of Oracle that allows a user to save variables for the current session that are not accessible by other users, much like an environment variable in UNIX.

As shown in FIG. 1, when the user attempts to access encrypted data, the encrypted data key (1) for the current user is retrieved from the DBENCRYPT_KEYS table (2), and is decrypted with the RSA algorithm (3) using the private key (4) stored in the application context. The resulting data key, no longer in encrypted format, is saved in the application context. As each row of data is read out of or into the column, it is encrypted or decrypted using the data key directly from the application context.

To perform transparent encryption, the following steps are taken:
1. The base table is renamed with the _BASE suffix.
2. A view is created which uses functions and the data key in the application context to decrypt the data as it is read.
3. An INSTEAD OF trigger is generated for the view which executes when rows are INSERTED, DELETE, or UPDATED.

An INSTEAD OF trigger allows the user to insert, update, or delete values from a view with a function-generated column. Any encrypted columns must be decrypted using a function call. The INSTEAD OF trigger is necessary to use because when a function call is used in a view, the user can no longer modify the view directly. An INSTEAD OF trigger solves this problem. However, INSTEAD OF triggers are only available in Oracle8i Enterprise Edition and greater.

The security of the system is dependent on preventing the private key from being discovered. The invention can be configured to use one of the following three methods of securing the user's private key: (1) with a password; (2) in an operating system file; or (3) in a secure view.

Private keys can be secured using passwords. The best way to implement this is to use the same passwords used to logon to Oracle to also encrypt the data. For ease of administration, these two passwords can be the same, however there may be situations in which a user may want to maintain different passwords. If the invention password mirrors the Oracle password, whenever a user changes the Oracle password, they should also change their invention password. After logging into the database, the user must also log into the invention by running the following command: <BEGIN DBENCRYPT.LOGIN('yourpassword'); END;>

Figure 2:
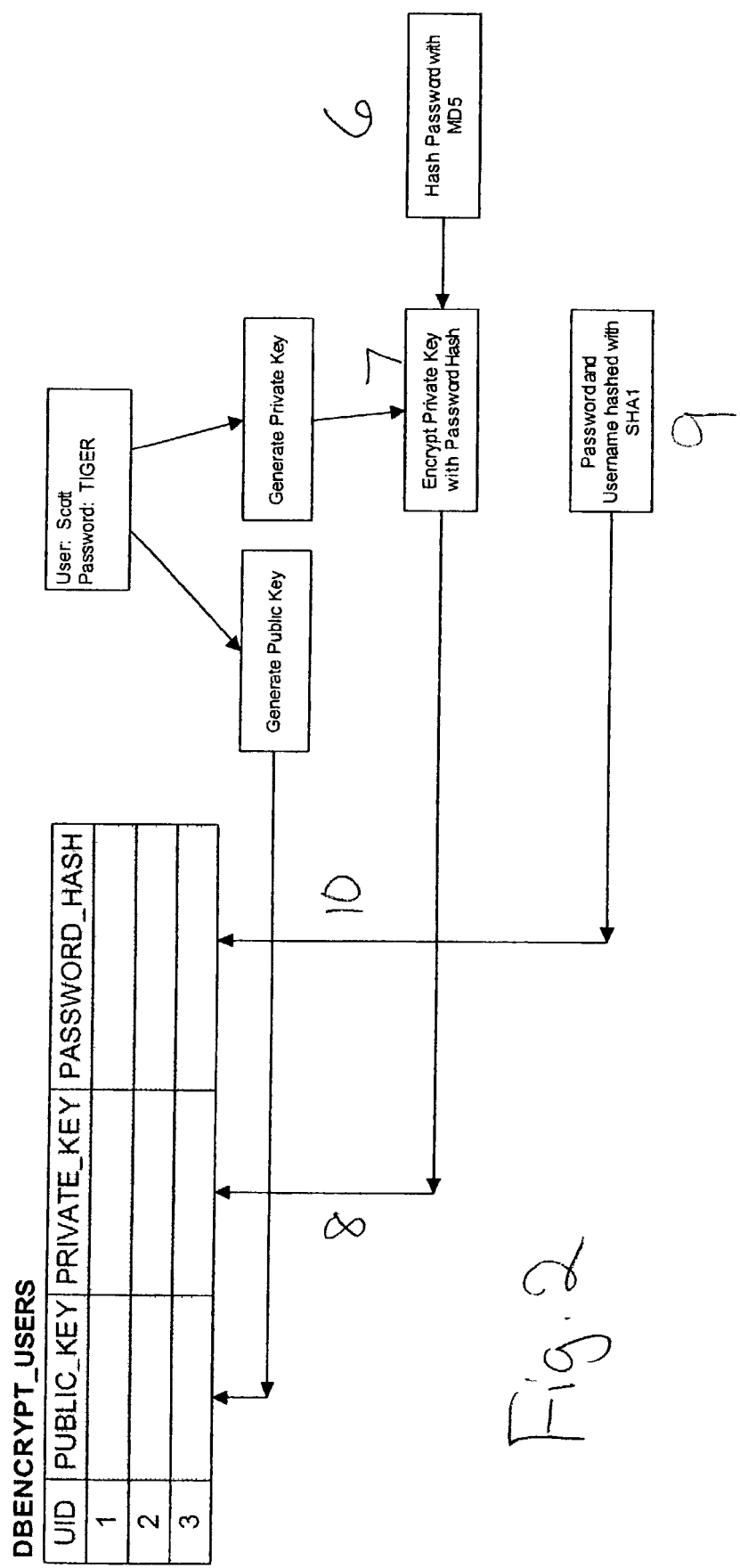
FIG. 2 is a functional block diagram showing password authentication.

Password authentication occurs within the encrypted database, and is implemented as follows:

As shown in FIG. 2, the steps to secure the user's private key are as follows:
1. The password is hashed using MD5 (6).
2. The MD5 result is then used to encrypt the private key with the AES algorithms (7).
3. The encrypted private key is stored in the database (8).
4. In order to verify that the user submits the correct password later, the username and password are concatenated and hashed (9) using SHA-1 to create a 160-bit hash value.
5. The SHA-1 password hash is also stored in the database (10). (One note to make here is that this password hash is more secure than the Oracle generated hashes because DbEncrypt hashes are at least 128-bits while Oracle passwords are 56-bit.)

Steps to logon and retrieve the user's private key—
1. When the DBENCRYPT.LOGIN function is executed, the password hash (9) and the encrypted private key (7) are read out of the PASSWORD_HASH (10) and PRIVATE_KEY (8) columns in the DBENCRYPT_USERS table.
2. The password passed to the LOGIN function is prepended to the username and hashed using SHA-1.
3. The result is compared to the PASSWORD_HASH value to verify that the password provided is correct.
4. If the password is incorrect, the login fails.
5. If the password hashes match, the PRIVATE_KEY value is decrypted with an MD5 hash of the password.
6. The decrypted private key is then stored in the application context.

Figure 3:
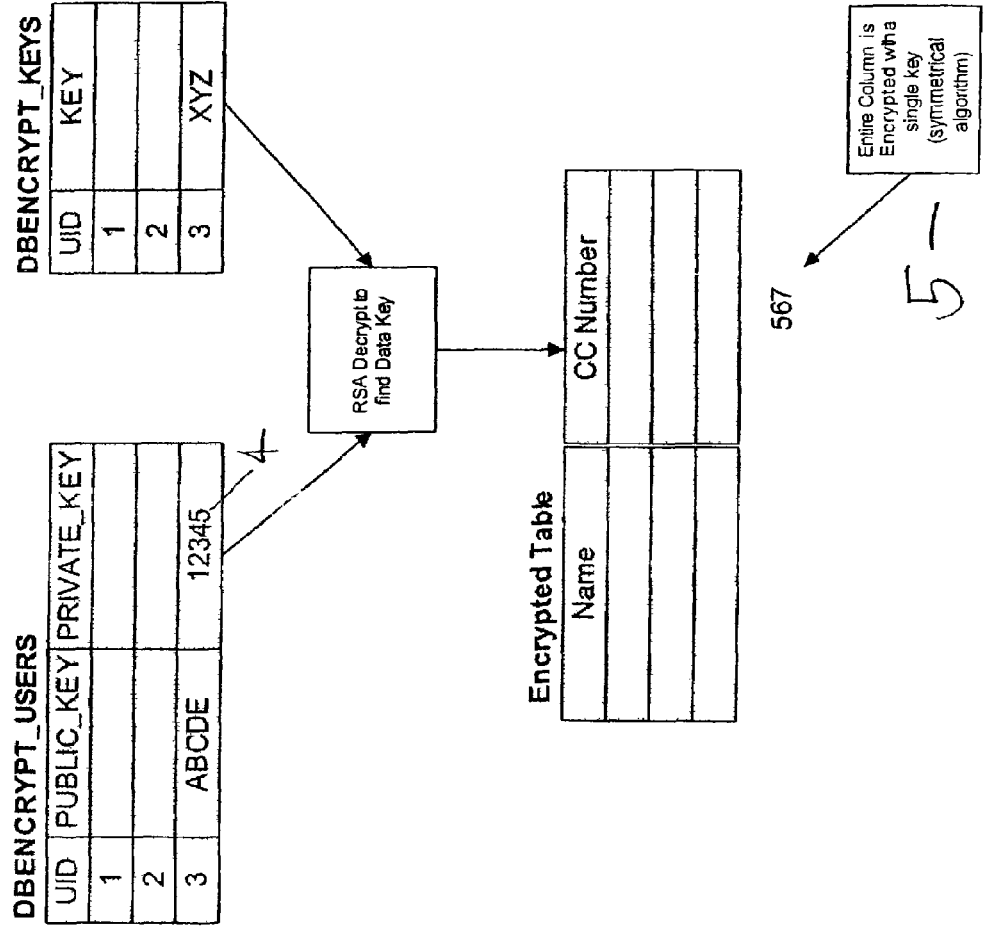
FIG. 3 is a functional block diagram showing reading data from a column.

FIG. 3 shows the steps taken when reading encrypted data out of a table:
1. The encrypted symmetrical key is loaded from DBENCRYPT_KEYS (2).
2. The private key (4) loaded during logon is used to decrypt the symmetrical key.
3. The symmetrical key is used decrypt the data in the table.

Private keys can be secured by storing them in an operating system file. These operating system files are not accessible directly from PL/SQL. By calling the functions DBENCRYPT.LOAD_KEY and DBENCRYPT.SAVE_KEY, the file .key <username> is loaded for the user calling the function. These functions will not allow users to load or save the key for other users. When a user logs into the database, a database connection trigger is fired causing the following function to execute:

<DBENCRYPT. OS_FILE_LOGIN;>

The OS_FILE_LOGIN function calls the DBENCRYPT.LOAD_KEY function and stores the results in the application [context value "DBENCRYPT_CONTEXT.PRIVATE_KEY". Later on when a column is read or modified, this private key will be used to decrypt the key in the DBENCRYPT_KEYS table for the specific column. Among the drawbacks to this mechanism is that anyone with access to the operating system files can read the private key. Using this method requires that access to the operating system files be strictly controlled.

A "secure view" refers to securing private keys by storing them in a table, creating a view on the table that only allows users to see there own rows, and restricting access to the base table. The base table is DBENCRYPT_PRIV_KEYS_BASE and the secure view to the base table is DBENCRYPT_PRIV_KEYS. When a user logs into the database, a database connection trigger is fired causing the following function to execute:

<DBENCRYPT. SECURE_VIEW_LOGIN;>

The SECURE_VIEW_LOGIN function selects from the DBENCRYPT.DBENCRYPT_PRIV_KEYS view and stores the results in the application context value "DBENCRYPT_CONTEXT. PRIVATE_KEY". Later on when a column is read or modified, this private key will be used to decrypt the key in the DBENCRYPT_KEYS table for the specific column.

Among the drawbacks to this mechanism is that anyone with the privilege SELECT ANY TABLE can read the private key. Using this method requires that privileges in the database by strictly controlled to never allow any access to select from the DBENCRYPT_PRIV_KEYS_BASE table.

Before a user can read or write encrypted data, that user must be established as an authorized user. When a user is established, an entry is added to the DBENCRYPT_USERS table The entry contains the username, the user's public key in clear text, the user's private key encrypted, and a password hash if password authentication is in place.

When a column is selected to be encrypted, the following steps are taken.

A symmetrical key is created

The column is encrypted with the symmetrical key (5)

For each user that should have access to the table, a copy of the key is encrypted with the public key and stored in the DBENCRPYT_KEYS table (2).

The table is renamed with the _BASE extension

A view is created to decrypt data read from the table.

A trigger is created on the view to encrypt data written to the table

Application context are built-in features of Oracle. There are unique problems that the invention solves in using application contexts to store Encryption keys. Although application contexts are limited to 255 characters, the invention solves this problem by assembling the key into segments that can be stored in separate contexts and then reassembling the key when necessary.

Values in an application context are referenced using user defined parameter names. When storing a value in the context, the user specifies the parameter name and the value of the parameter. When retrieving a value, the parameter name is all that is required. If the parameter name is valid, then the appropriate value is returned to the user; otherwise a NULL value is returned.

Disassembling (or Partitioning) Keys in the Context:

The algorithm for partitioning the keys into 256 is as follows:

Determine how many 256-character segments there are by taking ceiling of the length of the key divided by 256. The ceiling of a number is defined as the first integer that is greater or equal to the given value.

Store the number of segments obtained in the previous step in the user context for later use when disassembling (or reconstituting) the key.

Initialize a pointer to the first character of the key.

Loop through the number of segments determined in the first step. In each loop, retrieve 256 characters of the key starting at the pointer and store them in the invention's context, then update the pointer's position by 256 characters.

Retreiving (or reconstituting) the key consists of somewhat the reverse of the partitioning process:

Retrieve the number of segments that we stored in the invention's context.

Check that the value is valid, i.e. not null or greater than 0

Initialize a variable that will hold the reconstituted key.

If valid then loop through the number of segments. In each loop we retrieve from the context each segment of the key and append it to the variable.

The Decryption Views only serve to select from tables and call decryption functions as view columns. Since PL/SQL commands can not be embedded directly into views, it can be difficult to know when to load the appropriate data keys when a table is first accessed or to reload a key when a data key changes. The invention solves this problem in the following way:

1. During the logon to the invention, the current sequence number is loaded into the application context from the DBENCRYPT_KEY_GENERATED table.

2. When a user selects from a table, the encrypt columns are decrypted using the DECRYPT_STRING_VALUE function or the DECRYPT_NUMBER_VALUE function.

3. The DECRYPT_STRING_VALUE and DECRYPT_NUMBER_VALUE functions first verify that the specific data key for the column has been loaded.

4. If the data key has not been load, the encrypted symmetrical key is loaded into memory and decrypted using the RSA algorithm with the private key stored in the application context.

5. If the data key has already been loaded, check the sequence number loaded at startup (now stored in the user's application context) against the current sequence number (just loaded from the DBENCRYPT_KEY_GENERATED table).

6. If the current sequence number is greater than the sequence number stored in the application context, the user will need to reload the data keys.

7. Once the correct data key is loaded, the current encrypted value is decrypted with the selected algorithm and the decrypted results are returned to the view.

One requirement of many organizations using encryption is a mechanism to recover data in the case when the passwords in use are lost. This is especially important when the keys are based on passwords that can be forgotten. The invention is also designed so that multiple users share the same symmetrical key using different secrets, therefore eliminating the chance of a single user forgetting a password resulting in data loss.

To offset this risk, the invention can be installed with a restoration user. The restoration account is simply another account that is given access to all columns, and is never used until a restoration situation is encountered. The restoration account is created during installation and a 128-bit random password is set for the account and displayed on the screen. This password should be written down and locked in a safe or some other physical secure medium. Although many organizations require a recovery mechanism such as this to prevent data loss, it can also be viewed as a security weakness. If this password is not properly secured, all encrypted data can be compromised, and thus the installation and use of this function is optional.

The following steps are taken when a column is encrypted to provide the backup mechanism:

1. The symmetrical key is generated and used to encrypt the data in a single column (see FIG. 1, 5).
2. For each user granted access to the data, the symmetrical key is encrypted with the RSA algorithm using the user's public key and is stored in the DBENCRPYT_KEYS table (2).
3. The symmetrical key is also encrypted using the RSA algorithm with the RESTORATION_ACCOUNT's public key and stored in the DBENCRYPT_KEYS table (2).

The gives the RESTORATION_ACCOUNT access to all columns. In case all other users loss the passwords to decrypt their private keys, the restoration account can be used as a backup.

The INSTEAD OF trigger is created for the view which decrypts the data. The INSTEAD OF trigger intercepts updates to the table and replaces the updating value with the equivalent encrypted value. The encryption works as follows:

1. During the logon to the invention, the current sequence number is loaded into the application context from the DBENCRYPT_KEY_GENERATED table.
2. When modifying the data in a view, the INSTEAD OF trigger is fired.
3. The INSTEAD OF trigger first verify that the specific data key for the column has been loaded.
4. If the data key has not been loaded, the encrypted symmetrical key is loaded into memory and decrypted using the RSA algorithm with the private key stored in the application context.
5. If the data key has already been loaded, the sequence number loaded at startup (now stored in the user's application context) is checked against the current sequence number (just loaded from the DBENCRYPT_KEY_GENERATED table).
6. If the current sequence number is greater than the sequence number stored in the application context, the new data keys are loaded.
7. Once the data is properly encrypted, the new values are modified in the table directly by performing the INSERT, UPDATE, or DELETE referencing the ROWID of the base table.

When encrypting strings within a database, problems arise because of the use of NULL characters to terminate strings. To illustrate this problem, consider the following string: <A A R O N>

This is stored on the physical disk as:
<0x41 0x41 0x52 0x4F 0x4E 0x00>.

The item to note here is the trailing 0x00 which tells the software that the string ends. If this data is encrypted, the null terminated character is no longer 0x00 and other characters that are not 0x00 may be encrypted 0x00. This results in the size of the string changing and part of the string possibly being lost.

To deal with this situation, the invention offers two solutions. The first is to hex encode and string data. Hex encoding string data changes it from the ASCII character A to the two ASCII characters 41, which represent the underlying value of A. This prevents data in the middle of a string from becoming a NULL character resulting in truncated data. The problem with this solution is that data that is hex-encoded effectively doubles the size of the data. For instance, A becomes 41, which cause the space requirement to store the encrypted data to double.

Another solution to this issue is to change the data type of the column storing the data to binary. Binary data may contain NULL characters so there is no problem with data being truncated by NULL characters in the data.

The invention also provides a mechanism to reset a user's password. Resetting a user's password also requires assigning the user a new private/public key pair and re-granting access to encrypted columns, since without the private key, there is no way to retrieve the encrypted symmetrical data keys. To reset a user's password the following steps are taken:

1. An administrator regenerates a private/public key pair for the user.
2. The public key is stored in the DBENCRYPT_USERS table.
3. The new password is hashed using MD5.
4. The MD5 result is then used to encrypt the private key with the AES algorithm.
5. The encrypted private key is stored in the database.
6. In order to verify that the user submitted the correct password later, the username and password are concatenated and hashed using SHA-1 to create a 160-bit hash value.
7. The SHA-1 password hash is also stored in the table.
8. Access to the column must be re-granted.
9. To re-grant access to the column, the symmetrical key for each column the user needs access to is encrypted with the user's public key and is stored in the DBENCRYPT_KEYS table. This can only be done by a user with access to the column because only such user will have access to the decrypted symmetrical key.
10. The new password should be given to the new user and the new user should choose a new password.

To grant access to a user to encrypt and decrypt values in a table, the following steps are taken:

1. The encrypted symmetrical key for the grantor is load from the DBENCRYPT_KEYS table.
2. The key is decrypted using the private key of the grantor (Note: can only be done by a user that has been granted access to the column.)
3. The symmetrical key is encrypted using RSA with the grantee's public key and is stored in the DBENCRPYT_KEYS table.

To revoke access from a user to encrypt and decrypt values in a table, the row within the DBENCRPYT_KEYS table containing the copy of the symmetrical key encrypted with the user's public key is deleted.

To alleviate the damage that a compromise key could cause, the administrator of the system should periodically reset the symmetrical keys used to encrypt the data. This is accomplished by running the function DBENCRYPT.CHANGE_KEY. The CHANGE_KEY function performs the following steps:
1. The encrypted symmetrical key is loaded from the DBENCRYPT_KEYS table.
2. The key is decrypted using the private key of the current user. This must be done by a user that has been granted access to the column.
3. The data is decrypted using the symmetrical key.
4. The keys are deleted from the DBENCRYPT_KEYS table.
5. The view is dropped.
6. The INSTEAD OF trigger is dropped.
7. The table is renamed without the _BASE extension.

To alleviate the damage that a compromise key could cause, the administrator should periodically reset the symmetrical keys used to encrypt the data. This is accomplished by running the function DBENCRYPT.CHANGE_KEY. the CHANGE_KEY function performs the following steps:
1. The encrypted symmetrical key is loaded from the DBENCRYPT_KEYS table.
2. The key is decrypted using the private key of the current user. This must be done by a user that has been granted access to the column.
3. A new symmetrical key is generated by randomly generating a number.
4. The column data in each row is read out and decrypted using the old key and the stored and encrypted using the new key.
5. For each user that currently has been granted access, the symmetrical key is encrypted using RSA with each user's individual public key and stored in the DBENCRPYT_KEYS table.

Since other modifications or changes will be apparent to those skilled in the art, there have been described above the principles of this invention in connection with specific apparatus and method steps, it is to be clearly understood that this description is made only by way of example and not as a limitation to the scope of the invention.

What is claimed is:

1. A system for managing the encryption and decryption of data residing in a database, comprising:
   a graphical user interface for automatically and transparently encrypting and decrypting a set of objects residing in the database;
   the set of objects being a table, a column, a key, and a view;
   a username and a password;
   a graphical encryption control for encrypting and decrypting the set of objects, the graphical encryption control being accessible through the graphical user interface;
   a key pair comprising a public key and a private key, the public key being stored in a key table;
   a hash of the private key and the password, the hash being stored in the key table, and;
   a second hash of the username concatenated with the password, the second hash being stored in the database.

2. The system for managing the encryption and decryption of data residing in a database of claim 1, further comprising:
   a private key generator for generating the private key;
   a public key generator for generating the public key; the public key being generated from the private key;
   the graphical encryption control having a menu for choosing an encryption algorithim and a key size to encrypt a target column.

3. The system for managing the encryption and decryption of data residing in a database of claim 1, further comprising:
   a randomly generated symmetrical key;
   a private key associated with a user for encrypting the symmetrical key, the user having a name and having an authorization to decrypt a column, the column having a name;
   the user name being associated with a column name; and
   a table for storing the user name, the column name and the symmetrical key.

4. An encryption system for encrypting data residing in a database, comprising:
   a symmetrical key for encrypting a column within a table;
   a copy of said symmetrical key encrypted with a public key;
   said encrypted symmetrical key copy stored in a table;
   a user interface for decrypting data read from said data table;
   said user interface view having a trigger to encrypt data written to said table;
   a private key generator for generating a private key;
   a public key generator for generating a public key from said private key;
   the public key being stored in the key table;
   a database for storing said public key;
   a user having a name and a password;
   a hash of said user name concatenated with said user password, the bash being stored in said database;
   a second hash of said user password; and
   an encrypted private key encrypted with said hash of said user password for storage in said database.

5. An encryption system for encrypting data residing in a database, comprising:
   a set of objects within said database operable to transparently encrypt data, comprising:
      a trigger operable to encrypt data as said data is modified or created in a column;
      a view operable to decrypt said data as said data is selected from said column;
   a set of functions within said database comprising:
      means for encrypting a private key associated with a user requiring authorization to decrypt data;
      means for storing an encrypted private key;
      means for decrypting said encrypted private key;
      means for verifying proper decryption of said encrypted private key;
      means for encrypting and decrypting, using a symmetrical key, said column containing said data;
      means for securely storing said symmetrical key;
      means for securely loading said symmetrical key;
      means for changing said symmetrical key and re-encrypting said data;
   a private key generator for generating a private key;
   a public key generator for generating a public key from said private key;
   a database for storing said public key;
   a user having a name and a password;
   a hash of said user name concatenated with said user password;
   a hash of said user password; and
   an encrypted private key encrypted with said hash of said user password, for storage in said database.

* * * * *